(12) United States Patent
Hibino

(10) Patent No.: US 10,250,769 B2
(45) Date of Patent: **\*Apr. 2, 2019**

(54) IMAGE FORMING APPARATUS USING DECOLORABLE AND NON-DECOLORABLE TONER FOR PRINTING ACQUIRED IMAGES

(71) Applicants: KABUSHIKI KAISHA TOSHIBA, Tokyo (JP); TOSHIBA TEC KABUSHIKI KAISHA, Tokyo (JP)

(72) Inventor: Makoto Hibino, Tagata Shizuoka (JP)

(73) Assignees: Kabushiki Kaisha Toshiba, Tokyo (JP); Toshiba TEC Kabushiki Kaisha, Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 15/832,260

(22) Filed: Dec. 5, 2017

(65) Prior Publication Data

US 2018/0097955 A1 Apr. 5, 2018

Related U.S. Application Data

(63) Continuation of application No. 15/252,044, filed on Aug. 30, 2016, now Pat. No. 9,871,936.

(30) Foreign Application Priority Data

Nov. 30, 2015 (JP) ................ 2015-232934

(51) Int. Cl.
*G03G 15/01* (2006.01)
*G03G 15/00* (2006.01)
(Continued)

(52) U.S. Cl.
CPC ......... *H04N 1/00801* (2013.01); *G03G 15/01* (2013.01); *G03G 15/0189* (2013.01);
(Continued)

(58) Field of Classification Search
CPC ............... G03G 15/01; G03G 15/5016; G03G 15/6585; H04N 1/00801; H04N 1/00005; H04N 1/00411; G06K 9/00456
See application file for complete search history.

(56) References Cited

U.S. PATENT DOCUMENTS

| 4,992,828 A | 2/1991 | Liston |
| 9,871,936 B2 \* | 1/2018 | Hibino ............... H04N 1/00801 |

(Continued)

FOREIGN PATENT DOCUMENTS

| JP | 2001216298 A | 8/2001 |
| JP | 2012-226350 | 11/2012 |
| JP | 2015-197672 | 11/2015 |

OTHER PUBLICATIONS

European Office Action dated Jan. 24, 2019, mailed in counterpart European Application No. 16199904.0, 4 pages.

*Primary Examiner* — Sandra Brase
(74) *Attorney, Agent, or Firm* — Kim & Stewart LLP

(57) ABSTRACT

An image forming apparatus includes a reading unit, an image forming unit, and a controller. The reading unit is configured to acquire image data by reading an image on a first sheet. The image forming unit is configure to form an image from the image data on a second sheet using a first color material and a second color material. The controller is configured to perform text recognition on the image data, cause the image forming unit to form text from the image data on the second sheet using the second color material, and cause the image forming unit to form portions of the image data other than the text on the second sheet using the first color material.

16 Claims, 3 Drawing Sheets

(51) Int. Cl.
*H04N 1/00* (2006.01)
*H04N 1/23* (2006.01)
*H04N 1/60* (2006.01)
*G06K 9/00* (2006.01)

(52) U.S. Cl.
CPC ..... *G03G 15/5025* (2013.01); *G06K 9/00456* (2013.01); *H04N 1/00005* (2013.01); *H04N 1/00411* (2013.01); *H04N 1/00474* (2013.01); *H04N 1/233* (2013.01); *H04N 1/6008* (2013.01); *G06K 2209/01* (2013.01); *H04N 2201/0094* (2013.01)

(56) References Cited

U.S. PATENT DOCUMENTS

| | | |
|---|---|---|
| 2011/0318061 A1 | 12/2011 | Kubo et al. |
| 2012/0038941 A1 | 2/2012 | Megawa |
| 2012/0321350 A1 | 12/2012 | Ogasawara |
| 2015/0043042 A1 | 2/2015 | Kato |
| 2015/0043929 A1 | 2/2015 | Yagi et al. |

\* cited by examiner

IMAGE FORMING APPARATUS USING DECOLORABLE AND NON-DECOLORABLE TONER FOR PRINTING ACQUIRED IMAGES

CROSS-REFERENCE TO RELATED APPLICATIONS

This application is a continuation of U.S. patent application Ser. No. 15/252,044, filed on Aug. 30, 2016, which is based upon and claims the benefit of priority from Japanese Patent Application No. 2015-232934, filed on Nov. 30, 2015, the entire contents of each of which are incorporated herein by reference.

FIELD

Embodiments described herein relate generally to a printing technology.

BACKGROUND

There are known image forming apparatuses that form images on sheets based on image data. In the related art, there are technologies for printing only text objects based on image data using designated toner different from toner used to print other image objects.

However, when an image forming apparatus executes copying, all copied image data are image objects. Therefore, there is a problem in that text (which is an image object in a copying process) in image data may not be printed using the designated toner.

DETAILED DESCRIPTION

According to an embodiment, there is provided a technology for printing text in read image data using a color material different from color materials of other portions of the read image data in a copying process.

In general, according to an embodiment, an image forming apparatus includes a reading unit, an image forming unit, and a controller. The reading unit is configured to acquire image data by reading an image on a first sheet. The image forming unit is configured to form an image from the image data on a second sheet using a first color material and a second color material. The controller is configured to perform text recognition on the image data, cause the image forming unit to form text from the image data on the second sheet using the second color material, and cause the image forming unit to form portions of the image data other than the text on the second sheet using the first color material.

Hereinafter, an embodiment will be described with reference to the drawings.

Figure 1:
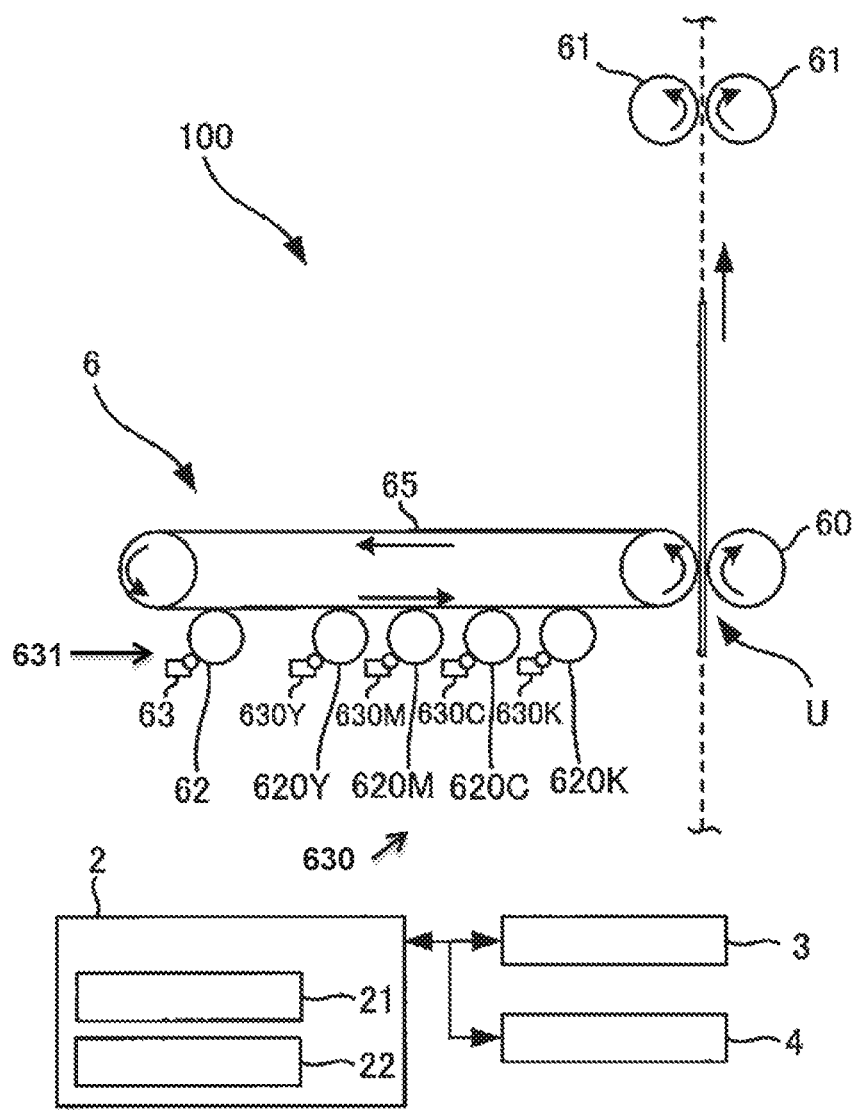
FIG. 1 is a schematic diagram illustrating an image forming apparatus.

FIG. 1 is a schematic diagram illustrating an image forming apparatus 100.

The image forming apparatus 100 is a multi-function peripheral (MFP) that has a plurality of functions such as copying, printing, scanning, faxing, and email transmission.

The image forming apparatus 100 includes an image forming unit 6 capable of forming an image on a sheet by non-decolorable toner (first color material) of a plurality of colors, by decolorable toner (second color material) of a plurality of colors, and by both the non-decolorable toner and the decolorable toner.

In the embodiment, the decolorable toner is used as a decolorable material. The decolorable material contains a coloring compound, a developer, and a decoloring agent. An example of the coloring compound includes a leuco dye that colors blue. An example of the developer includes phenols. An example of the decoloring agent includes a material that has no affinity to a developer and is made compatible with a coloring compound when heated. The decolorable material colors by interaction of a coloring compound and a developer, and color is removed when the interaction of the coloring compound and the developer is diminished by heating at a decoloring temperature or more.

As the decolorable material, decolorable ink may also be used. In this case, the image forming unit 6 is configured to form an image on a sheet by an ink jet method rather than by an electrographic method. In an ink jet method, photosensitive drums 620Y, 620M, 620C, 620K, and 62 are used to form an image on a sheet by ejecting decolorable ink from an ink jet head.

In the embodiment, the image forming apparatus 100 uses four colors, cyan (C), magenta (M), yellow (Y), and black (K) as non-decolorable toner, although the image forming apparatus 100 may be configured to use only the non-decolorable toner K, or another non-decolorable toner.

In the embodiment, the image forming apparatus 100 uses only blue decolorable toner, although the image forming apparatus 100 may be configured to use four colors, C, M, Y, and K, as decolorable toner.

A fixing unit 61 fixes the decolorable toner to the second sheet by heating the sheet to a decolorable toner fixing temperature. The fixing unit 61 likewise fixes the non-decolorable toner to the second sheet by heating the second sheet to a non-decolorable toner fixing temperature. A decoloring temperature, at which color is removed from the decolorable toner, is higher than both the decolorable toner fixing temperature and the non-decolorable toner fixing temperature. Thus, the non-decolorable toner is not erased at the decoloring temperature of the decolorable toner.

The word "decoloring," as used herein, means that an image formed with a color different from the background color of the second sheet (including not only chromatic color but also achromatic color such as white or black) is no longer seen visually or is rarely seen visually. The phrase "no longer seen visually" means that the image, originally formed from one or more colors visibly distinct from the background color of the second sheet, has been changed to have only colors the same as, or similar to, the background color of the second sheet, or the material from which the image is formed has been made achromatic or transparent.

In the image forming unit 6, a first developing assembly 630, comprising the photosensitive drums 620Y to 620K and the developing units 630Y, 630M, 630C, and 630K, is used to develop the non-decolorable toners and a second developing assembly 631, comprising a photosensitive drum 62 and developing unit 63, is used to develop the blue decolorable toner.

The first developing assembly 630 is located between a secondary transfer position U, and the second developing assembly 631 in a rotation direction of a transfer belt 65. The secondary transfer position U is a position at which a nip is formed by a secondary transfer roller 60 and the transfer belt 65. The positions of the first and second developing assemblies 630 and 631 may be reversed.

The image forming unit 6 causes laser units (not illustrated) to form electrostatic latent images on the photosensitive drums 620Y to 620K and 62 and causes the developing units 630Y to 630K and 63 to develop the electrostatic latent images using the non-decolorable toner and the decolorable toner. The image forming unit 6 transfers the developed toner images to the second sheet at the secondary transfer position U through the transfer belt 65.

In the image forming apparatus 100, the second sheet is transmitted to the fixing unit 61 after the image forming unit 6 forms the toner images on the second sheet. In the image forming apparatus 100, the fixing unit 61 heats the second sheet and fixes the toner images to the second sheet.

The image forming apparatus 100 includes a controller 2, a display unit 3, and an input unit 4. The controller 2 controls the entire image forming apparatus 100. The controller 2 includes a processor 21 and a memory 22. The processor 21 reads a program stored in the memory 22 to perform various processes. The processor 21 may be divided into several portions for each processing function or may include an application specific integrated circuit (ASIC). The memory 22 may include a hard disk drive (HDD).

Thus, the controller causes the first developing assembly of the image forming unit 6 to form all, or a portion, of an image acquired from the first sheet by the reading unit from the first color material for subsequent fixing to the second sheet in the fixing unit 61. The controller also causes the second developing assembly of the image forming unit 6 to form all, or a portion, of an image acquired from the first sheet by the reading unit from the second color material for subsequent fixing to the second sheet in the fixing unit 61.

The display unit 3 is a touch panel or the like, and displays setting information or an operation status of the image forming apparatus 100, log information, and notification to a user.

The input unit 4 is a button, a key, or a touch panel. The input unit 4 receives an input of the user, and receives an instruction of a function operation of the image forming apparatus 100 such as a printing instruction or an input of setting.

Figure 2:
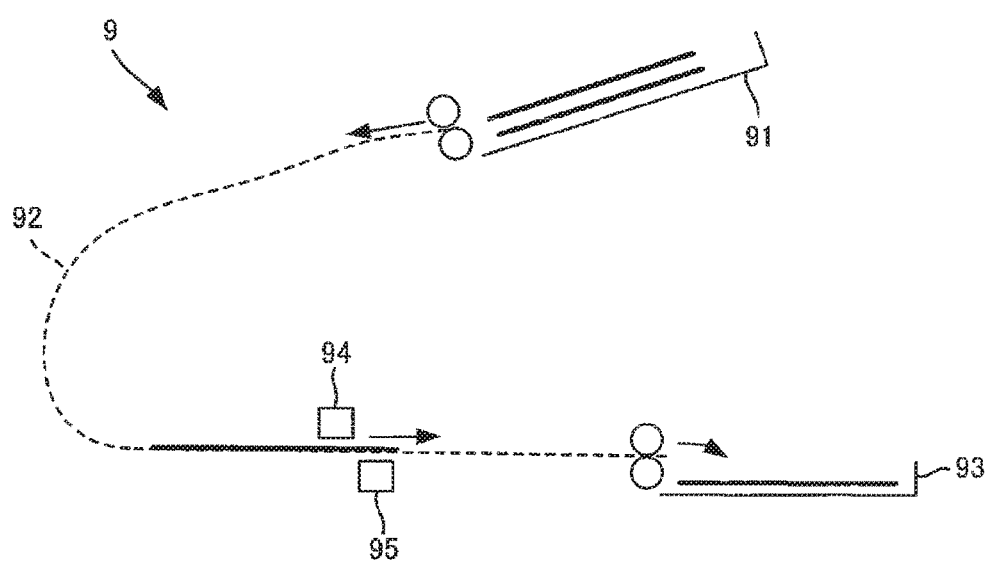
FIG. 2 is a schematic diagram illustrating an automatic document feeder (ADF).

FIG. 2 is a schematic diagram illustrating an ADF 9.

The image forming apparatus 100 includes the ADF 9, although not shown in FIG. 1. The ADF 9 feeds a sheet from a sheet feeding tray 91 to a transport path 92. The ADF 9 causes reading units 94 and 95 to read images of both surfaces of the sheet, and then discharges the sheet to a sheet discharging tray 93. The reading units 94 and 95 may include a charge coupled device (CCD).

Figure 3:
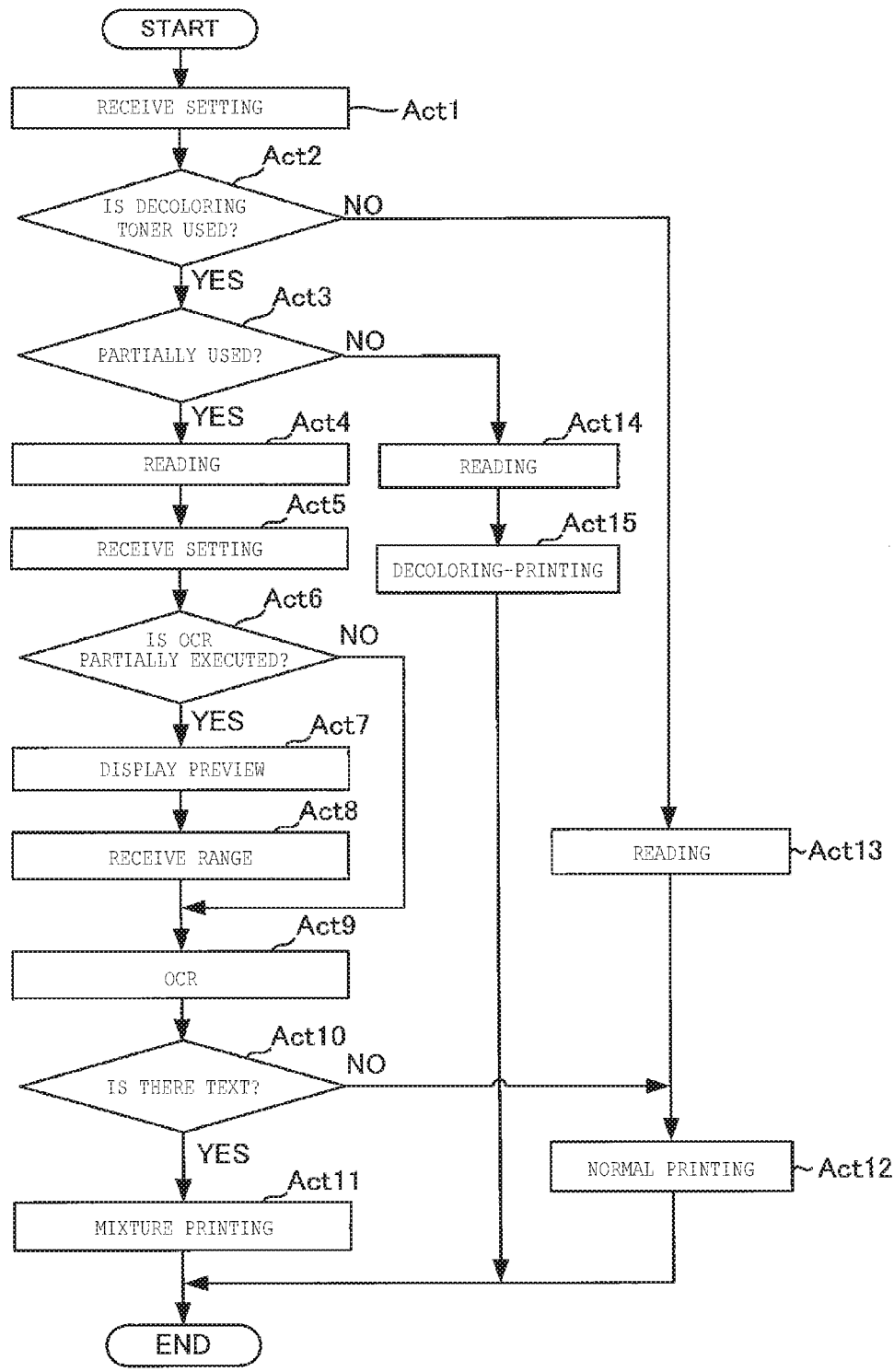
FIG. 3 is a flowchart illustrating a copying process by a processor.

FIG. 3 is a flowchart illustrating a copying process by the processor 21.

The processor 21 displays a setting screen on the display unit 3 for selecting a first image forming process using only the non-decolorable toner, a second image forming process using the decolorable toner only for text, and a third image forming process using only the decolorable toner. The processor 21 receives one selection of the first, second, and third copying processes on the setting screen (Act 1).

When the second copying process using the decolorable toner only for text is selected (YES in Act 2 and YES in Act 3), the processor 21 reads an image on a sheet (Act 4).

The processor 21 displays a setting screen on the display unit 3 for selecting whether to perform a first text recognition (optical character recognition (OCR)) process on the entire surface of the read image data or to perform a second text recognition process in a designated range of the read image data. The processor 21 receives one selection of the first text recognition and the second text recognition on the setting screen (Act 5).

When the second text recognition is selected, for executing text recognition in the designated range of the image data (Yes in Act 6), the processor 21 displays the read image data on the display unit 3 (Act 7).

The processor 21 receives the user's designation of a range in which text recognition is performed (Act 8). The user can designate the range for text recognition by specifying an upper and lower bound for the range in the image data using the display unit 3 or other input device.

After Act 8, the processor 21 performs the text recognition in the designated range of the image data (Act 9). When the first text recognition is selected, for executing text recognition on the entire image data (NO in Act 6), the processor 21 performs text recognition on the entire image data (Act 9).

When the processor 21 determines that there is text within the range in which the text recognition is performed in the image data (YES in Act 10), the processor 21 extracts the text and forms the text as an object (recognizes the text). The processor 21 prints the text object of the image data using the decolorable toner and prints the image objects of the image data, which is all the image data other than the extracted text objects, using the non-decolorable toner (Act 11).

When the processor 21 determines that there is no text within the range in which the text recognition is performed in the image data (NO in Act 10), the processor 21 prints all the image data with the non-decolorable toner (Act 12).

When the first copying process using only the non-decolorable toner is selected (NO in Act 2), the processor 21 reads an image on the sheet (Act 13) to acquire image data and prints the read image data with the non-decolorable toner (Act 12).

When the third copying process using only the decolorable toner is selected (NO in Act 3), the processor 21 reads an image on the sheet (Act 14) to acquire image data and prints the read image data with the decolorable toner (Act 15).

Modification Examples

In Act 11, the processor 21 may print only a designated portion of the text subjected to the text recognition in the image data with the second color material, for example the decolorable toner.

The processor 21 may perform the text recognition on the image data of the sheet read by the reading units 94 and 95, may cause the image forming unit 6 to form the text on a sheet using the second color material, and may cause the image forming unit 6 to form portions other than the text of the image data on the sheet using the first color material different from the second color material.

Accordingly, in the above embodiment, the decolorable material is used as the second color material, the non-decolorable material is used as the first color material. Alternately, a special color material (toner or ink) which may not have a CMYK color may be used as the second color material. The special color material may have a golden color or glossy color or a color material containing a glistening lame.

The sheet, or recording medium, may be a normal sheet, a heat-sensitive sheet, a resin film, or cloth.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a reading unit configured to acquire image data by reading an image on a first sheet;
   an image forming unit configured to form an image from the image data on a second sheet using a first color material and a second color material;
   an input unit configured to receive a selection of one of a first copying process, a second copying process, and a third copying process; and
   a controller configured to:
      when the first copying process is selected, cause the image forming unit to print the image data on the second sheet using the first color material;
      when the second copying process is selected, perform text recognition on the image data, and cause the image forming unit to print the image data on the second sheet using the first color material and the second color material based on a result of the text recognition; and
      when the third copying process is selected, cause the image forming unit to print the image data on the second sheet using the second color material.

2. The apparatus according to claim 1, wherein the text recognition is performed according to user-selected conditions.

3. The apparatus according to claim 2, further comprising a display unit,
   wherein the controller is further configured to cause the display unit to display a setting screen for selecting a range of the image data in which text recognition is to be performed, to cause the input unit to receive selection of the range, and to perform text recognition on the image data within the range.

4. The apparatus according to claim 3, wherein the controller is further configured to receive selection of the range by definition of an upper and lower boundary of the range.

5. The apparatus according to claim 3, wherein the controller is further configured to cause the display unit to display a setting screen for selecting the first copying process using only a non-decolorable toner, the second copying process using a decolorable toner only for text, and the third copying process using only the decolorable toner.

6. The apparatus according to claim 2,
   wherein the controller is configured to cause the image forming unit to form a predetermined text of a text recognized by the text recognition on the second sheet using the second color material.

7. The apparatus according to claim 1,
   wherein the second color material is decolorable toner that removes color by heating.

8. The apparatus according to claim 7,
   wherein the first color material is non-decolorable toner that is not decolored at a decoloring temperature of the decolorable toner.

9. The apparatus according to claim 1, wherein one of the first and the second color material is a CYMK color material and the other is a material that does not have a CYMK color.

10. A method of forming an image on a sheet, comprising:
    reading an image from a first sheet to acquire image data;
    receiving a selection of one of a first copying process, a second copying process, and a third copying process; and
    printing the image on a second sheet, wherein:
    when the first copying process is selected, printing the image on the second sheet using a first color material; and
    when the second copying process is selected:
       performing text recognition on the image data to define one or more text objects and one or more image objects; and
       based on a result of the text recognition, printing an image of the one or more text objects on the second sheet using the first color material, and printing an image of the one or more image objects on the second sheet using a second color material.

11. The method according to claim 10, wherein the text recognition is performed according to user-selected conditions.

12. The method of claim 11, wherein the text recognition is performed in a selected range of the image data.

13. The method of claim 11, wherein a portion of the text objects is formed using the first color material.

14. The method of claim 10, wherein one of the first color material and the second color material is a CYMK color material and the other is a material that does not have a CYMK color.

15. The method of claim 10, wherein one of the first color material and the second color material is a non-decolorable material and the other is a decolorable material.

16. The method of claim 10, wherein when the third copying process is selected, cause the image forming unit to print the image data on the second sheet using the second color material.

* * * * *